United States Patent
Jin

(10) Patent No.: US 12,526,542 B2
(45) Date of Patent: Jan. 13, 2026

(54) IMAGE SENSOR FOR DISTANCE MEASUREMENT AND CAMERA MODULE INCLUDING THE SAME

(71) Applicant: Samsung Electronics Co., Ltd., Suwon-si (KR)

(72) Inventor: Younggu Jin, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 61 days.

(21) Appl. No.: 18/425,255

(22) Filed: Jan. 29, 2024

(65) Prior Publication Data
US 2024/0276112 A1  Aug. 15, 2024

(30) Foreign Application Priority Data
Feb. 14, 2023  (KR) .................. 10-2023-0019539

(51) Int. Cl.
| | |
|---|---|
| H04N 23/56 | (2023.01) |
| G01S 7/4863 | (2020.01) |
| G01S 17/894 | (2020.01) |
| H04N 25/53 | (2023.01) |
| H04N 25/771 | (2023.01) |
| H04N 25/78 | (2023.01) |

(52) U.S. Cl.
CPC ........... *H04N 25/53* (2023.01); *G01S 7/4863* (2013.01); *G01S 17/894* (2020.01); *H04N 23/56* (2023.01); *H04N 25/771* (2023.01); *H04N 25/78* (2023.01)

(58) Field of Classification Search
CPC ........ H04N 25/53; H04N 23/56; H04N 25/78; G01S 17/894; G01S 7/4863

USPC ......................................................... 348/135
See application file for complete search history.

(56) References Cited

U.S. PATENT DOCUMENTS

| | | | |
|---|---|---|---|
| 8,217,327 B2 | 7/2012 | Kim | |
| 8,642,938 B2 | 2/2014 | Bikumandla et al. | |
| 9,866,208 B2 | 1/2018 | Wyland | |
| 2012/0281206 A1* | 11/2012 | Ko ..................... | H10F 39/802 356/218 |
| 2013/0181119 A1 | 7/2013 | Bikumandla et al. | |
| 2015/0204970 A1 | 7/2015 | Jeong et al. | |
| 2016/0118424 A1* | 4/2016 | Guidash ............... | H10F 39/811 257/231 |

(Continued)

FOREIGN PATENT DOCUMENTS

JP          5431810 B2      3/2014

OTHER PUBLICATIONS

Gupta, M., et al., "What Are Optimal Coding Functions for Time-of-Flight Imaging?" ACM Transactions on Graphics, vol. 37, No. 2, Article 13, Feb. 2018, https://dl.acm.org/doi/10.1145/3152155.

*Primary Examiner* — Jeffery A Williams
(74) *Attorney, Agent, or Firm* — Harness, Dickey & Pierce, P.L.C.

(57) ABSTRACT

An image sensor for distance measurement and a camera module including the same are provided. The image sensor includes a pixel array including a plurality of unit pixels, a control circuit configured to provide a plurality of photo gate signals to the plurality of unit pixels, respectively, and a readout circuit configured to read out pixel signals from the pixel array on a frame-by-frame basis, wherein the control circuit generates the plurality of photo gate signals such that a pulse width is changed within one frame section.

18 Claims, 15 Drawing Sheets

(56) References Cited

U.S. PATENT DOCUMENTS

2016/0295193 A1 10/2016 Van Nieuwenhove et al.
2016/0306045 A1 10/2016 Van Der Tempel et al.
2022/0043116 A1 2/2022 Jin et al.

* cited by examiner

IMAGE SENSOR FOR DISTANCE MEASUREMENT AND CAMERA MODULE INCLUDING THE SAME

CROSS-REFERENCE TO RELATED APPLICATION

This application is based on and claims priority under 35 U.S.C. § 119 to Korean Patent Application No. 10-2023-0019539, filed on Feb. 14, 2023, in the Korean Intellectual Property Office, the entire contents of which are incorporated herein by reference.

BACKGROUND

The inventive concepts described herein relate to an image sensor, and more particularly, to an image sensor for distance measurement and a camera module including the same.

A time-of-flight (ToF) based image sensor may generate a 3D image of an object by measuring information related to a distance to the object from the ToF-based image sensor. The ToF-based image sensor may obtain the information related to the distance of the object from the ToF-based image sensor by measuring a light flight time until light reflected from the object is received after light is irradiated to the object. Since distance-related information includes noise due to various factors, it may be desired to reduce or minimize noise in order to obtain more accurate information.

SUMMARY

Some example embodiments according to the inventive concepts provide an image sensor for distance measurement and a camera module including the same.

According to some example embodiments, there is provided an image sensor for distance measurement, the image sensor including a pixel array including a plurality of unit pixels, a control circuit configured to provide a plurality of photo gate signals to the plurality of unit pixels, respectively, and a readout circuit configured to read out pixel signals from the pixel array on a frame-by-frame basis, and wherein the control circuit is configured to generate the plurality of photo gate signals such that a pulse width is changed within one frame section.

According to some example embodiments, there is provided a camera module including a light source unit configured to transmit a transmission light signal to an object, and an image sensor configured to receive a reception light signal reflected from the object, wherein the image sensor includes a pixel array including a plurality of unit pixels, a control circuit configured to transmit a modulation signal to the light source unit and transmit a plurality of photo gate signals having an identical to that of the modulation frequency as the modulation signal to each of the plurality of unit pixels, and a readout circuit configured to read out pixel signals from the pixel array on a frame-by-frame basis, and wherein the control circuit is configured to generate the plurality of photo gate signals such that a pulse width is changed within one frame section.

According to some example embodiments, there is provided a camera module including a light source unit configured to transmit a transmission light signal to an object, and an image sensor configured to receive a reception light signal reflected from the object, wherein the image sensor includes a pixel array including a plurality of unit pixels, a control circuit configured to transmit a plurality of photo gate signals to each of the plurality of unit pixels in an integration section in which photo charges generated according to the reception light signal are accumulated, and a readout circuit configured to read out pixel signals from the pixel array in a readout section, and wherein the control circuit is configured to generate the plurality of photo gate signals such that a pulse width is changed in the integration section.

BRIEF DESCRIPTION OF THE DRAWINGS

The inventive concepts will be more clearly understood from the following detailed description of some example embodiments according to the inventive concepts taken in conjunction with the accompanying drawings in which.

DETAILED DESCRIPTION OF THE EMBODIMENTS

Hereinafter, some example embodiments will be described in detail with reference to the accompanying drawings.

The accompanying drawings are illustrative in nature and are not restrictive. For example, one of ordinary skill in the art will appreciate that drawings which illustrate components of a device may include more components or fewer components than those specifically shown therein. Moreover, one of ordinary skill in the art will appreciate that the drawings may enlarge or simplify various components for convenience of explanation but are not limited thereto.

As used herein, the singular forms "a" and "an" are intended to include the plural forms as well, unless expressly indicated otherwise. Likewise, the terms "the" and similar instruction terms may correspond to both singular and plural.

Although elements throughout the following description may be referred to as first, second or the like, as used herein, these terms are used to distinguish one element or component from another element or component and should not be interpreted to limit the described example embodiments unless expressly indicated otherwise.

As described herein, one or more of the elements may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Elements may be described and/or shown herein as transferring, or configured to transfer, electric signals to other elements or may be electrically connected to other elements. However, such a description should not be construed to limit their arrangement. For example, additional components and/or different configurations in addition to example embodiments described herein may be implemented without departing from the inventive concepts.

Figure 1:
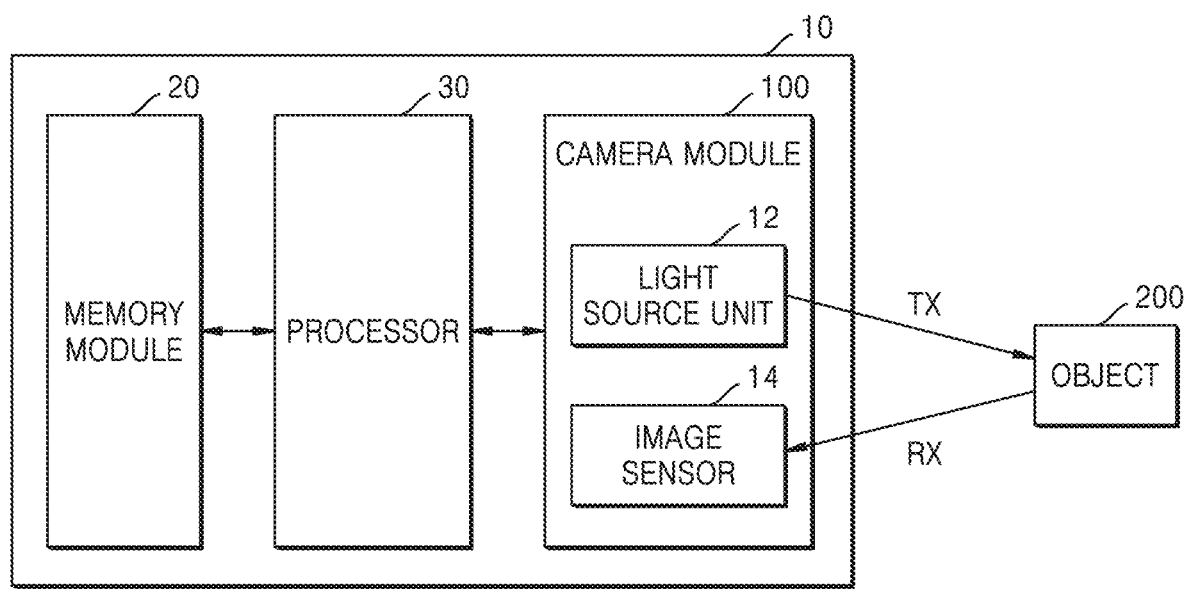
FIG. 1 is a schematic configuration diagram of a system according to some example embodiments.

FIG. 1 is a schematic configuration diagram of a system according to some example embodiments.

Referring to FIG. 1, a system 10 may include a processor 30 and a camera module 100. The system 10 may further include a memory module 20 that is connected to the processor 30 and stores information, such as image data received from the camera module 100. In some example embodiments, the system 10 may be integrated on a single semiconductor chip, and each of the camera module 100, the processor 30, and the memory module 20 may be implemented as a separate semiconductor chip. The memory module 20 may include one or more memory chips. In some example embodiments, processor 30 may include multiple processing chips.

Although FIG. 1 illustrates the processor 30 and the memory module 20 in the system 10, the inventive concepts are not limited thereto and, according to some example embodiments, the processor 30 and the memory module 20 may be provided in the camera module 100. For example, the image sensor 14 of the camera module 100 may include a memory and/or an image signal processor, and at this time, image data (e.g., IDATA of FIG. 2) may be stored in the memory in the image sensor 14, and the image signal processor in the image sensor 14 may process the image data IDATA to calculate distance information or depth information about the object 200. Therefore, based on the image data IDATA output from the image sensor 14, the distance information may be calculated by the processor 30 external to the camera module 100 or may be independently calculated by an image signal processor included in the image sensor 14 and output from the image sensor 14.

The system 10 may be an electronic device for application of an image sensor for distance measurement according to some example embodiments. The system 10 may be portable or stationary. Examples of the portable form of the system 10 may include mobile devices, cell phones, smartphones, user equipment (UE), tablets, digital cameras, laptop or desktop computers, electronic smart watches, machine-to-machine (M2M) communication devices, virtual reality (VR) devices or modules, robots, and the like. Examples of stationary types of the system 10 may include game consoles in video game parlors, interactive video terminals, automobiles, machine vision systems, industrial robots, VR devices, driver-side mounted cameras in automobiles, and the like. Although the foregoing examples have been listed, the inventive concepts should not be limited thereto as one of ordinary skill in the art would appreciate that the system 10 may be implemented in various devices in addition to those listed above.

The camera module 100 may include a light source unit 12 and an image sensor 14. The transmission light signal TX output from the light source unit 12 may be reflected on the object 200, and the image sensor 14 may receive the reception light signal RX reflected from the object 200. The image sensor 14 may obtain depth information, which is distance information about the object 200, using time-of-flight (TOF).

The light source unit 12 may include a light source and a light source driver for driving the light source. The image sensor 14 may include a pixel array, a control circuit for driving the pixel array, and a readout circuit for reading out a pixel signal output from the pixel array.

The processor 30 may be a central processing unit (CPU) that is a general-purpose processor. In some example embodiments, the processor 30 may further include a microcontroller, a digital signal processor (DSP), a graphics processing unit (GPU), an application specific integrated circuit (ASIC) processor, and the like in addition to the CPU. Additionally, processor 30 may include more than one CPU operating in a distributed processing environment. In some example embodiments, the processor 30 may be a System on Chip (SoC) having functions additional to those of a CPU, and may be an application processor (AP) mounted on a smart phone, tablet computer, smart watch, or the like.

The processor 30 may control operations of the camera module 100. In some example embodiments, the system 10 may include a plurality of camera modules, and the processor 30 may receive depth data from the image sensor 14 of the camera module 100 and merge the depth data with image data provided from other camera modules to generate a 3D depth image. The processor 30 may display the 3D depth image on the display screen of the system 10.

The processor 30 may be programmed with software or firmware to perform the various processing tasks described herein. In some example embodiments, the processor 30 may include programmable hardware logic circuits to perform some or all of the functions described above and may perform additional functions to those described above. For example, the memory module 20 may store program codes, look-up tables, or intermediate calculation results so that the processor 30 may perform a corresponding function.

The memory module 20 may be, for example, a dynamic random access memory (DRAM) such as synchronous DRAM (SDRAM), a high bandwidth memory (HBM) module, or a DRAM-based 3-dimensional stack (3DS) memory module such as a hybrid memory cube (HMC) memory module. The memory module 20 may be, for example, a semiconductor-based storage, such as Solid State Drive (SSD), DRAM module, or Static Random Access Memory (SRAM), Phase-Change Random Access Memory (PRAM), Resistive Random Access Memory (RRAM), Conductive-Bridging RAM (CBRAM), Magnetic RAM (MRAM), Spin-Transfer Torque MRAM (STT-MRAM), and the like.

Figure 2:
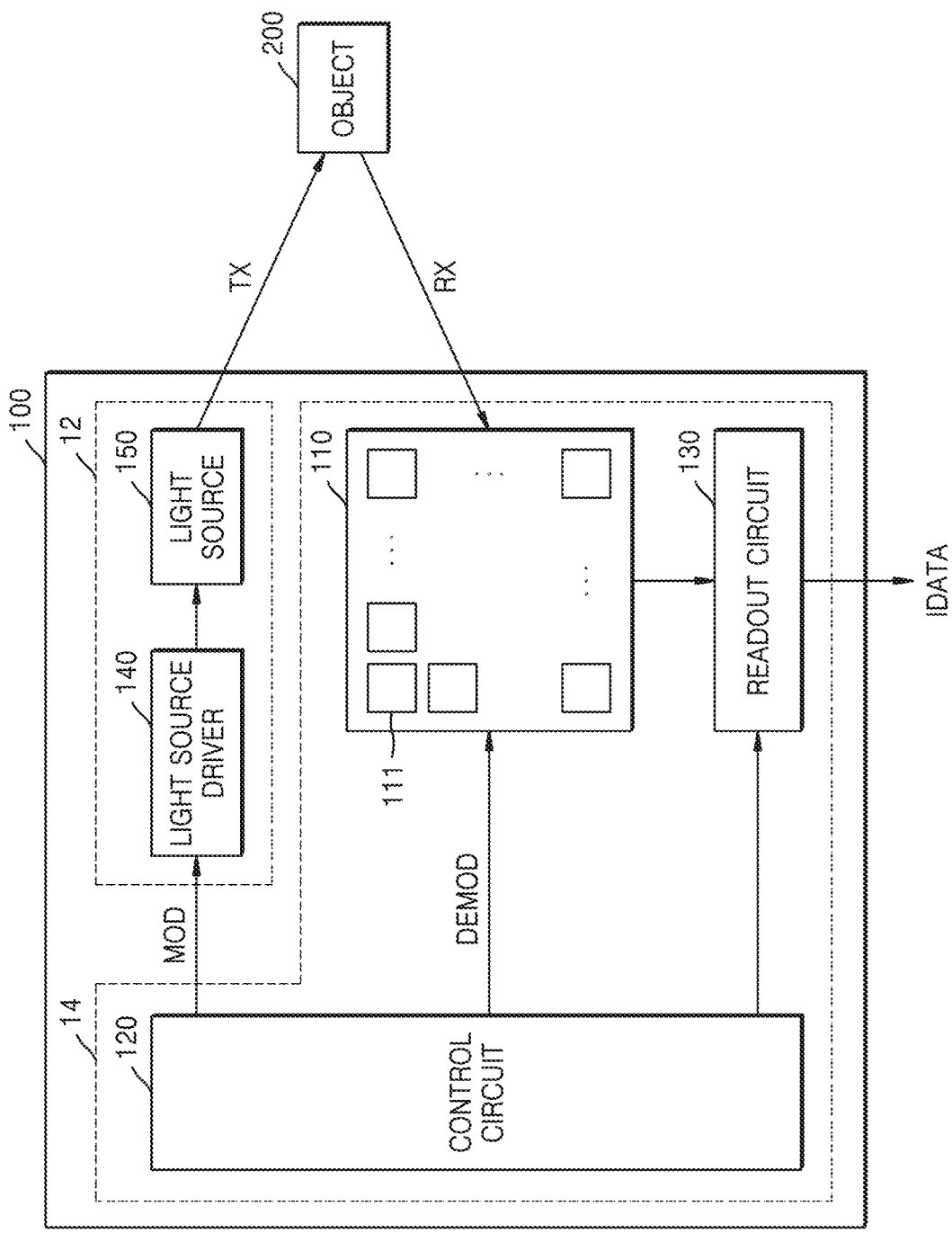
FIG. 2 is a configuration diagram illustrating a camera module according to some example embodiments.

FIG. 2 is a configuration diagram for explaining a camera module according to some example embodiments.

Referring to FIGS. 1 and 2, the camera module 100 may be used to obtain distance information related to the distance of the 3D object 200 from the camera module 100. Based on the image data IDATA output from the image sensor 14, the distance information may be calculated by the processor 30 or may be independently calculated by an image signal processor included in the image sensor 14 and output to the outside of the image sensor 14. In some example embodiments, the distance information is used as part of the 3D user interface by the processor 30 to allow a user of the system 10 to interact with or use a 3D image of the 3D object 200 as part of a game or other application running on system 10.

The light source unit 12 may include a light source driver 140 and a light source 150. The light source unit 12 may further include a lens.

The light source 150 may transmit a transmission light signal TX to the object 200. The light source 150 may be, for example, Laser Diodes (LDs) or Light Emitting Diodes (LEDs) that emit infrared or visible light, Near infrared lasers (NIR), point light sources, white lamps and monochromatic light sources in combination with a monochromator, or a combination of other laser light sources. For example, the light source 150 may be a vertical-cavity surface-emitting laser (VCSEL). In some example embodiments, the light source 150 may output an infrared transmission light signal TX having a wavelength of about 800 nm to about 1000 nm but is not limited thereto.

The light source driver 140 may generate a driving signal for driving the light source 150. The light source driver 140 may generate the driving signal for driving the light source 150 in response to receiving a modulation signal MOD from the control circuit 120. The modulation signal MOD may be formed to have at least one designated modulation frequency.

The image sensor 14 may measure distance or depth using the ToF principle. A reception light signal RX reflected from the object 200 may be received by the image sensor 14. The image sensor 14 may include a pixel array 110, a control circuit 120, and a readout circuit 130. The image sensor 14 may include a lens, and a reception light signal RX may be provided to the pixel array 110 through the lens. In addition, the image sensor 14 may include a ramp signal generator for providing a ramp signal to the readout circuit 130, and may include an ambient light detector (ALD) that calculates an ambient light environment and determines whether to perform a binning mode based on the ambient light environment.

The pixel array 110 may include a plurality of unit pixels 111. The plurality of unit pixels 111 may operate in a ToF method. The structure of each of the plurality of unit pixels 111 according to some example embodiments will be described later with reference to FIGS. 3 and 8.

The pixel array 110 may convert the received reception light signal RX into corresponding electrical signals, e.g., a plurality of pixel signals PS. The pixel array 110 may generate the plurality of pixel signals PS according to control signals provided from the control circuit 120. The pixel array 110 may receive a plurality of demodulation signals DEMOD from the control circuit 120 as photo gate signals for controlling each of the transfer transistors included in each unit pixel 111. The plurality of pixel signals PS may include phase difference information between a transmission light signal TX and a reception light signal RX.

The plurality of demodulation signals DEMOD may have the same frequency as the modulation signal MOD, e.g., the modulation frequency, and may include a first photo gate signal (e.g., PG1 of FIG. 3) and a second photo gate signal (e.g., PG2 of FIG. 3) having a phase difference from each other. For example, when the pulse widths of the first photo gate signal PG1 and the second photo gate signal PG2 are the same, based on the phase of the modulation signal MOD, in the first frame (e.g., an odd frame), the first photo gate signal PG1 may have a phase of 0° and the second photo gate signal PG2 may have a phase of 180°, and in the second frame (e.g., an even frame), the first photo gate signal PG1 may have a phase of 90° and the second photo gate signal PG2 may have a phase of 270°.

The plurality of pixel signals PS output from the pixel array 110 may include a first pixel signal (e.g., Vout1 in FIG. 3) generated according to the first photo gate signal PG1, and a second pixel signal (e.g., Vout2 of FIG. 3) generated according to the second photo gate signal PG2.

The plurality of demodulation signals DEMOD may have a modulation frequency and may include first to fourth photo gate signals (e.g., PGA to PGD of FIG. 8) having a phase difference from each other. For example, when the pulse widths of the first to fourth photo gate signals PGA to PGD are the same, based on the phase of the modulation signal MOD, the first photo gate signal PGA may have a phase of 0°, the second photo gate signal PGB may have a phase of 90°, the third photo gate signal PGC may have a phase of 180°, and the fourth photo gate signal PGD may have a phase of 270°.

The plurality of pixel signals output from the pixel array 110 may include a first pixel signal (e.g., Vout1 in FIG. 8) generated according to the first photo gate signal PGA, a second pixel signal (e.g., Vout2 in FIG. 8) generated according to the second photo gate signal PGB, a third pixel signal (e.g., Vout3 in FIG. 8) generated according to the third photo gate signal PGC, and a fourth pixel signal (e.g., Vout4 in FIG. 8) generated according to the fourth photo gate signal PGD.

The readout circuit 130 may generate image data IDATA based on the plurality of pixel signals PS output from the pixel array 110. For example, the readout circuit 130 may perform analog-to-digital conversion on the plurality of pixel signals PS. For example, the readout circuit 130 may include a Correlated Double Sampling (CDS) circuit, a column counter, and a decoder. The readout circuit 130 may perform a CDS operation of comparing a plurality of pixel signals PS with a ramp signal.

The image sensor 14 may further include a memory and may further include an image signal processor. Image data IDATA may be stored in the memory, and the image signal processor may calculate distance information or depth information by processing the image data IDATA. A memory or image signal processor may be provided outside of the image sensor 14.

The control circuit 120 may control components (e.g., the pixel array 110 and the readout circuit 130) of the image sensor 14, and may control the light source driver 140 of the light source unit 12. The control circuit 120 may transmit the modulation signal MOD to the light source driver 140 and transmit demodulation signals DEMOD corresponding to the modulation signal MOD to the pixel array 110. The control circuit 120 may include a photo gate driver for providing a plurality of demodulation signals DEMOD as photo gate signals to the pixel array 110, a row driver and decoder providing row control signals to the pixel array 110, a phase locked loop (PLL) circuit for generating an internal clock signal from a master clock signal, a timing generator for adjusting the timing of each control signal, a transmission circuit for transmitting a modulation signal MOD, and a main controller for receiving a command from the outside and controlling the operation of the image sensor 14.

In some example embodiments, the control circuit 120 may generate square wave photo gate signals having a pulse width (e.g., duty ratio) changed in a frame section in which one frame is defined. When the control circuit 120 generates a square wave photo gate signal having a constant pulse width in a frame period, an overlap section in which an activation section of a photo gate signal in which photo charges are accumulated in a certain tap of the unit pixel 111 and a section in which a reception light signal RX is received may overlap may be constant, and the resolution of depth information may be limited. On the other hand, the control circuit 120 according to some example embodiments may adjust the overlap section by adjusting the pulse width in the frame section. For example, the control circuit 120 may generate the photo gate signal to produce the same effect as having a triangular or trapezoidal waveform in one frame section. Accordingly, resolution of depth information may be increased, and accuracy of generating depth information may be increased.

Figure 3:
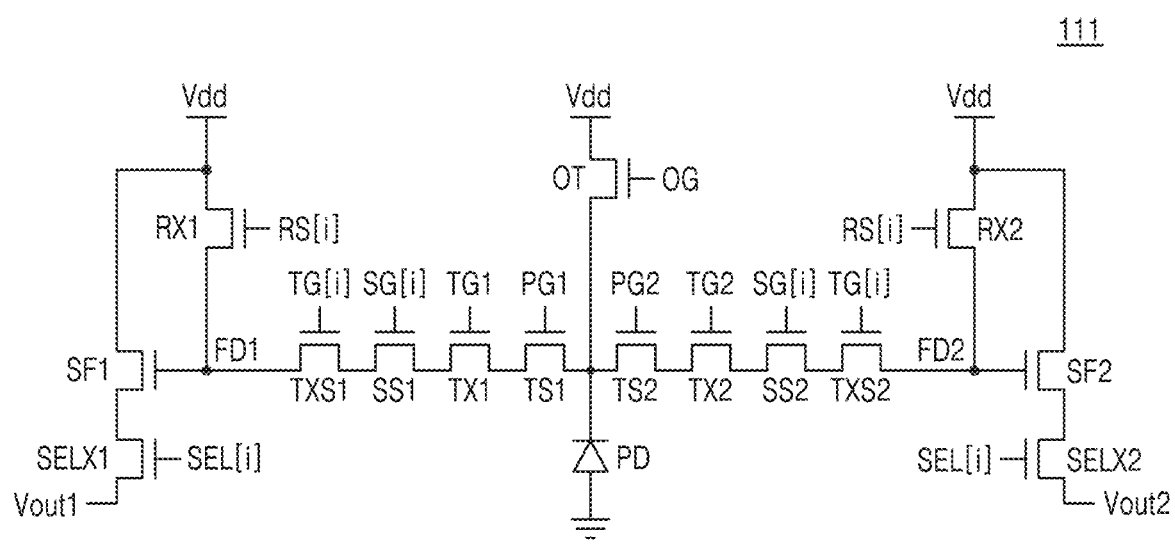
FIG. 3 is a diagram illustrating a structure of a unit pixel shown in FIG. 2 according to some example embodiments.

FIG. 3 is a diagram illustrating a structure of a unit pixel shown in FIG. 2 according to some example embodiments.

The unit pixel 111 described with reference to FIG. 3 according to some example embodiments may have a 2-tap structure. The 2-tap structure refers to a structure in which one unit pixel 111 includes two taps, and a tap may refer to a unit component capable of distinguishing and transferring photo charges generated and accumulated in the unit pixel 111 according to phases as a reception light signal RX in FIG. 2 is irradiated.

A method in which an image sensor (e.g., 14 in FIG. 2) including unit pixels 111 of a 2-tap structure transmits data for reference phases of 0°, 90°, 180°, and 270° using two taps may be implemented. For example, based on the phase of the modulation signal (MOD in FIG. 2), when the pulse widths of the photo gate signals PG1 and PG2 are the same with a duty ratio of 50%, in an odd frame, a first tap of the unit pixel 111 may generate a first pixel signal Vout1 with respect to a phase of 0°, and a second tap may generate a second pixel signal Vout2 with respect to a phase of 180°. In an even frame following an odd frame, the first tap may generate a first pixel signal Vout1 with respect to a phase of 90°, and the second tap may generate a second pixel signal Vout2 with respect to a phase of 270°.

The pixel array (e.g., 110 of FIG. 2) may include unit pixels 111 arranged in a plurality of rows (e.g., n rows, wherein, n is a positive integer) and a plurality of columns (e.g., m columns, wherein, m is a positive integer). In some example embodiments, the first tap and the second tap may be disposed in an i-th row where i is a number greater than or equal to 0 and less than or equal to n−1.

Referring to FIG. 3, the unit pixel 111 may include a photodiode PD, an overflow transistor OT, transfer transistors TS1 and TS2, transfer control transistors TX1 and TX2, storage transistors SS1 and SS2, tap transfer transistors TXS1 and TXS2, reset transistors RX1 and RX2, source followers SF1 and SF2, and select transistors SELX1 and SELX2. According to some example embodiments, at least one of the overflow transistor OT, the transfer transistors TS1 and TS1, the transfer control transistors TX1 and TX2, the storage transistors SS1 and SS2, the tap transfer transistors TXS1 and TXS2, the reset transistors RX1 and RX2, the source followers SF1 and SF1, and the select transistors SELX1 and SELX2 may be omitted or additional components may be included.

The photodiode PD may generate photo charges that vary according to the intensity of the reception light signal RX. For example, the photodiode PD may convert a reception light signal RX into an electrical signal. The photodiode PD is an example of a photoelectric conversion element, and may include at least one of a photo transistor, a photo gate, a pinned photo diode (PPD), and a combination thereof.

The first transfer transistor TS1 may transfer the charge generated by the photodiode PD to the first storage transistor SS1 according to the first photo gate signal PG1 having a phase of 0 degrees in an odd frame, and may transfer the charge generated by the photodiode PD to the first storage transistor SS1 according to the first photo gate signal PG1 having a phase of 90 degrees in an even frame.

The second transfer transistor TS2 may transfer the charge generated by the photodiode PD to the second storage transistor SS2 according to the second photo gate signal PG2 having a phase of 180 degrees in the odd frame, and may transfer the charge generated by the photodiode PD to the second storage transistor SS2 according to the second photo gate signal PG2 having a phase of 270 degrees in an even frame. However, as the pulse width of the first photo gate signal PG1 changes, the phase of the second photo gate signal PG2 may change based on 180° in an odd frame, and the phase of the second photo gate signal PG2 may change based on 270° in an even frame. The second photo gate signal PG2 may have an activation section which activates subsequent to an activation section of the first photo gate signal PG1.

The first photo gate signal PG1 and the second photo gate signal PG2 may be included in the demodulation signals DEMOD of FIG. 2, and may have the same frequency and different phases. The activation section of each of the first photo gate signal PG1 and the second photo gate signal PG2, e.g., the sum of the pulse widths, may be constant.

The unit pixel 111 may accumulate photo charges during the condensing time in even frames, and may output the first pixel signal Vout1 and the second pixel signal Vout2 generated according to the accumulation result to a readout circuit (e.g., 130 of FIG. 2). The unit pixel 111 may also accumulate photo charges during the condensing time in odd frames and may output the first pixel signal Vout1 and the second pixel signal Vout2 generated according to the accumulation result to the readout circuit 130.

The first transfer control transistor TX1 and the second transfer control transistor TX2 may transfer the transferred photo charges to the first storage transistor SS1 and the second storage transistor SS2, respectively, through the first transfer transistor TS1 and the second transfer transistor TS2 according to the first transfer control signal TG1 and the second transfer control signal TG2.

The first storage transistor SS1 and the second storage transistor SS2 may store the transferred photo charges that were transferred through each of the first transfer control transistor TX1 and the second transfer control transistor TX2 according to the storage control signal SG[i]. The first tap transfer transistor TXS1 and the second tap transfer transistor TXS2 may transfer photo charges stored in the first storage transistor SS1 and the second storage transistor SS2 to the first floating diffusion node FD1 and the second floating diffusion node FD2, respectively, according to the tap transfer control signal TG[i].

According to the potential due to the photo charges accumulated in each of the first floating diffusion node FD1 and the second floating diffusion node FD2, the first source follower SF1 and the second source follower SF2 may output an amplified voltage to the first select transistor SELX1 and the second select transistor SELX2. Each of the first select transistor SELX1 and the second select transistor SELX2 may output a first pixel signal Vout1 and a second pixel signal Vout2 through column lines in response to the selection control signal SEL[i].

The unit pixel 111 may accumulate photo charges for a certain period of time, for example, an integration time, and may output the first pixel signal Vout1 and the second pixel signal Vout2 generated according to the accumulation result to a readout circuit (e.g., 130 of FIG. 2).

Each of the first reset transistor RX1 and the second reset transistor RX2 may reset the first floating diffusion node FD1 and the second floating diffusion node FD2 by draining the accumulated charge to the power supply voltage Vdd in response to the reset control signal RS[i]. The overflow transistor OT may be a transistor for discharging overflow charge according to the overflow control signal OG, and a source of the overflow transistor OT may be connected to the photodiode PD, and a drain of the overflow transistor OT may be provided with the power supply voltage Vdd.

Figure 4A:
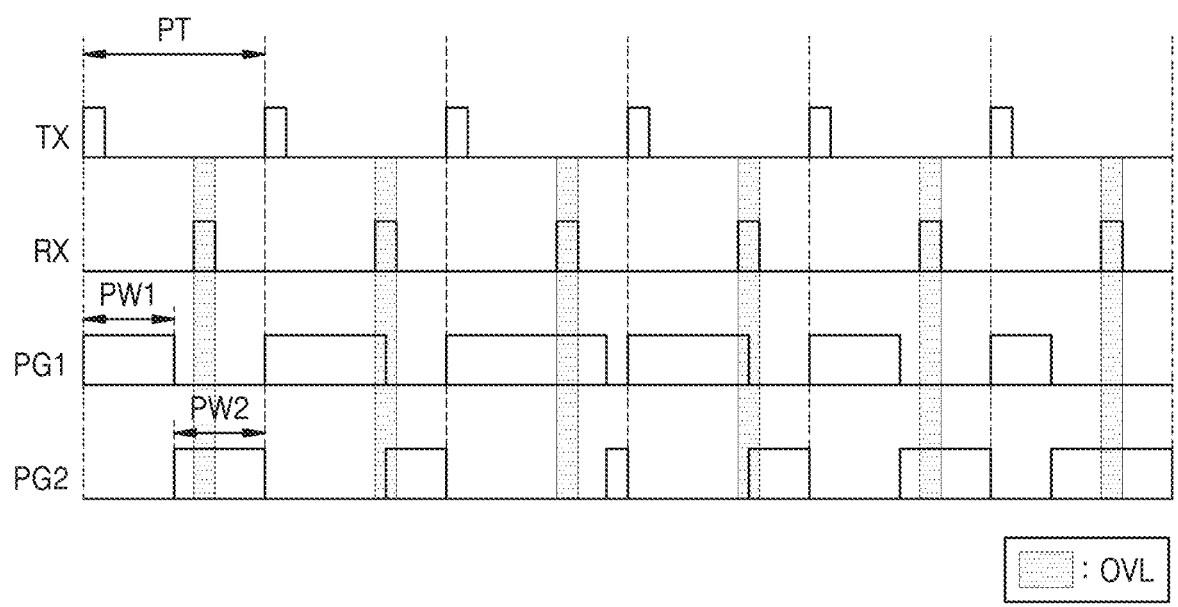
FIG. 4A is a diagram illustrating operations of an image sensor according some example embodiments.
Figure 4B:
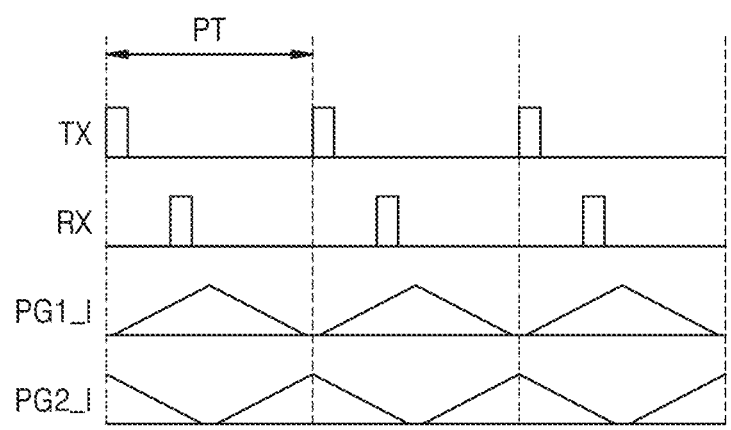
FIG. 4B is a timing diagram illustrating effects of a first photo gate signal and a second photo gate signal of FIG. 4A according to some example embodiments.

FIG. 4A is a diagram illustrating operations of an image sensor according to some example embodiments, and is a timing diagram illustrating pulse widths of a first photo gate signal and a second photo gate signal of FIG. 3 according to some example embodiments. FIG. 4B is a timing diagram illustrating effects of the first photo gate signal and the second photo gate signal of FIG. 4A according to some example embodiments. The first photo gate signal PG1 may be the first photo gate signal PG1 of FIG. 3, and the second photo gate signal PG2 may be the second photo gate signal PG2 of FIG. 3.

Referring to FIGS. 2 and 4A, the control circuit 120 may generate a modulation signal MOD having a modulation frequency, and accordingly, the light source unit 12 may transmit a transmission light signal TX having a modulation period PT that is a reciprocal value of the modulation frequency to the object 200. The image sensor 14 may receive a reception light signal RX having a certain period PT, and a device including the camera module 100 may measure the distance to the object 200 by calculating a phase difference between a transmission light signal TX and a reception light signal RX. In some example embodiments, the duty ratio of the modulation signal MOD, e.g., the duty ratio of the transmission light signal TX, may be 25% or less.

The control circuit 120 may generate a first photo gate signal PG1 and a second photo gate signal PG2 for an operation of accumulating photo charges generated by the photodiode in one frame section. The sum of the first pulse width PW1, which is an active section of the first photo gate signal PG1, and the second pulse width PW2, which is an active section of the second photo gate signal PG2, may coincide with the modulation period PT. For example, the time point at which the first photo gate signal PG1 starts to be activated may be the same as the time point at which the transmission light signal TX is generated, e.g., the time point at which the modulation signal MOD is activated. A time point at which the first photo gate signal PG1 starts to be deactivated may be the same as the time point at which the second photo gate signal PG2 starts to be activated. A time point at which the second photo gate signal PG2 starts to be deactivated may be the same as a time point at which the transmission light signal TX is generated, e.g., the time point at which the modulation signal MOD is activated.

The first pulse width PW1 of the first photo gate signal PG1 may be adjusted within a frame section. The second pulse width PW2 of the second photo gate signal PG2 may be adjusted within a frame section. In some example embodiments, the first pulse width PW1 may linearly increase and then linearly decrease, and the second pulse width PW2 may linearly decrease and then linearly increase. For example, among the first to sixth sections each having a length of the modulation period PT, the first pulse width PW1 may gradually and linearly increase in the first to third sections and may gradually and linearly decrease in the third to sixth sections. Similarly, the second pulse width PW2 may gradually and linearly decrease in the first to third sections and gradually and linearly increase in the third to sixth sections.

As the first pulse width PW1 of the first photo gate signal PG1 and the second pulse width PW2 of the second photo gate signal PG2 change within the frame section, an overlap section OVL in which the reception light signal RX and the first photo gate signal PG1 or the second photo gate signal PG2 overlap may be changed. For example, in the first section of the modulation period PT, the overlap section OVL may be formed in an active section of the second photo gate signal PG2, and in the second section, the overlap section OVL may be formed over the activation section of the first photo gate signal PG1 and the activation section of the second photo gate signal PG2 (for example, a part of the overlap section OVL may be formed in the activation section of the first photo gate signal PG1 and another part of the overlap section OVL may be formed in the activation section of the second photo gate signal PG2), and in the third section, the overlap section OVL may be formed in the active section of the first photo gate signal PG1, and in the fourth section, the overlap section OVL may be formed over the activation section of the first photo gate signal PG1 and the activation section of the second photo gate signal PG2, and in the fifth section, the overlap section OVL may be formed in the active section of the second photo gate signal PG2, and in the sixth section, the overlap section OVL may be formed in the active section of the second photo gate signal PG2.

When the overlap section OVL is formed in the active section of the first photo gate signal PG1, photo charges may be accumulated in the first tap, and when the overlap section OVL is formed in the active section of the second photo gate signal PG2, photo charges may be accumulated in the second tap. The image sensor 14, according to some example embodiments, may adjust the first pulse width PW1 of the first photo gate signal PG1 and the second pulse width PW2 of the second photo gate signal PG2 within a frame section to change the overlap section OVL, so that signal distortion caused by waveform distortion of the first photo gate signal PG1 or the second photo gate signal PG2, which occurs when the reception light signal RX has a relatively short pulse width and the first photo gate signal PG1 or the second photo gate signal PG2 overlap at the edge of the pulse, may be reduced.

Specifically, referring to FIGS. 4A and 4B, by adjusting the first pulse width PW1 of the first photo gate signal PG1 of square wave and the second pulse width PW2 of the second photo gate signal PG2 of square wave within the frame section, the image sensor 14 according to some example embodiments may simulate generating a first photo gate signal PG1_I (e.g., the first reference signal) of a triangular wave and a second photo gate signal PG2_I (e.g., the second reference signal) of a triangular wave (Hamiltonian coding method) and may obtain the same effect, e.g., may reduce the signal distortion caused by waveform distortion of the first photo gate signal PG1_I and the second photogate signal PG2_I. The first photo gate signal PG1_I and the second photo gate signal PG2_I of the triangular wave may have a modulation period PT and have a phase difference of 180 degrees from each other.

Compared to generating the first photo gate signal and the second photo gate signal of a square wave having a constant pulse width, in the case of generating the first photo gate signal PG1_I and the second photo gate signal PG2_I of triangular waves, finding the phase difference between the transmission light signal TX and the reception light signal RX may be accurate, and thus the resolution of depth information may be increased. Accordingly, the image sensor 14 according to some example embodiments may generate depth information having an increased resolution.

Although the waveform in one frame (e.g., odd frame) section has been described with reference to FIG. 4A, a first photo gate signal PG1 having a phase difference of 90 degrees from a transmission light signal TX may be generated in a next frame (e.g., an even frame) after the frame, a second photo gate signal PG2 following the first photo gate signal PG1 may also be generated.

Figure 5:
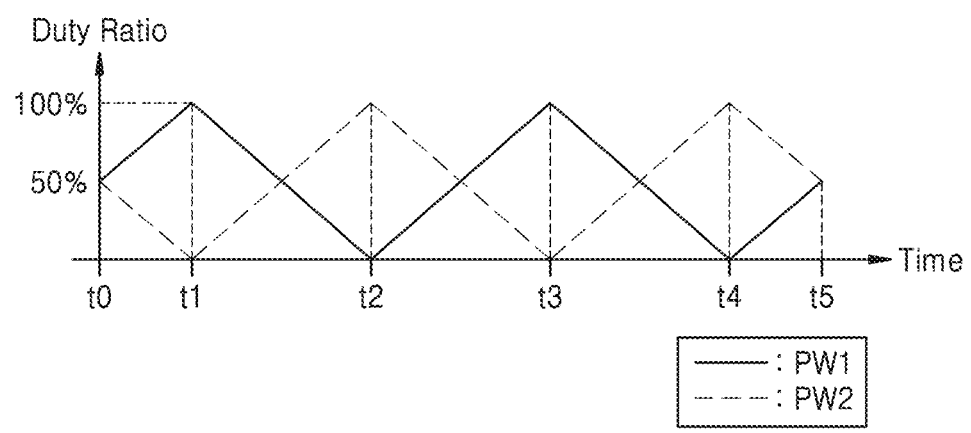
FIGS. 5 to 7 are diagrams illustrating an image sensor according to some example embodiments.
Figure 6:
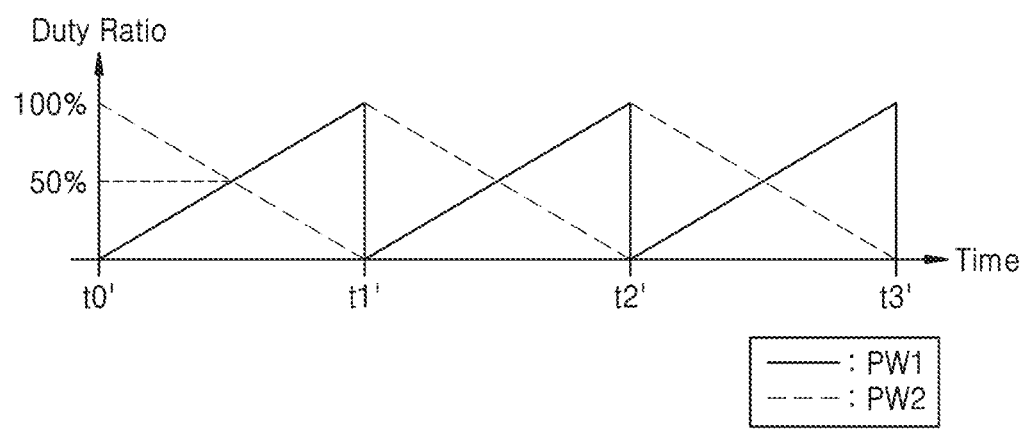
Figure 7:
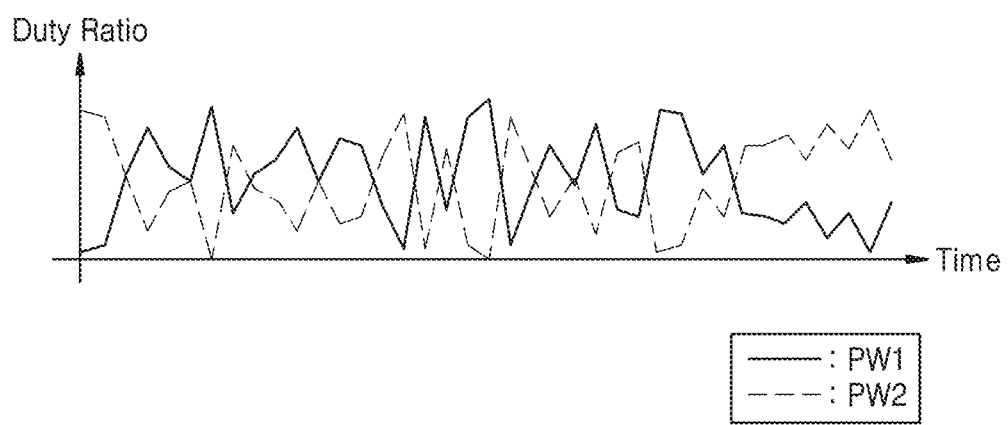

FIGS. 5 to 7 are diagrams illustrating operations of an image sensor according to some example embodiments, and are diagrams for explaining a change in pulse width according to time during a frame section.

Referring to FIG. 5, the first pulse width PW1 of the first photo gate signal PG1 may be changed in the form of a triangular wave that periodically increases and decreases between a duty ratio of 0% and a duty ratio of 100%. In addition, the second pulse width PW2 of the second photo gate signal PG2 may be changed in the form of a triangular wave that periodically decreases and increases between a duty ratio of 0% and a duty ratio of 100%. The sum of the first pulse width PW1 and the second pulse width PW2 may be constant and symmetrically varied. For example, the increase amount of the first pulse width PW1 may be equal to the decrease amount of the second pulse width PW2, and the decrease amount of the first pulse width PW1 may be equal to the increase amount of the second pulse width PW2.

From time point t0 to time point t1, from time point t2 to time point t3, from time point t4 to time point t5, the first pulse width PW1 may linearly increase, and the second pulse width PW2 may linearly decrease. From time point t1 to time point t2 and from time point t3 to time point t4, the first pulse width PW1 may linearly decrease, and the second pulse width PW2 may linearly increase. The absolute value of the increase rate and decrease rate of the first pulse width PW1 may be the same as the absolute value of the increase rate and decrease rate of the second pulse width PW2. When the first pulse width PW1 and the second pulse width PW2 are the same, the duty ratio may be 50%. Changes in the first pulse width PW1 and the second pulse width PW2 from time point t0 to time point t5 may be repeated one or more times within the frame section.

Referring to FIG. 6, the first pulse width PW1 of the first photo gate signal PG1 may be changed to have a sawtooth wave shape that periodically increases between a duty ratio of 0% and a duty ratio of 100% and the second pulse width PW2 of the second photo gate signal PG2 may be changed to have a sawtooth wave shape that periodically decreases between a duty ratio of 100% and a duty ratio of 0%. The sum of the first pulse width PW1 and the second pulse width PW2 may be constant and symmetrically varied. For example, the increase amount of the first pulse width PW1 may be equal to the decrease amount of the second pulse width PW2, and the decrease amount of the first pulse width PW1 may be equal to the increase amount of the second pulse width PW2. Alternatively, the first pulse width PW1 of the first photo gate signal PG1 and the second pulse width PW2 of the second photo gate signal PG2 shown in FIG. 6 may be interchanged and changed.

From time point t0' to time point t1', from time point t1' to time point t2', from time point t2' to time point t3', the first pulse width PW1 may linearly increase from a duty ratio of 0% to a duty ratio of 100%, and the second pulse width PW2 may linearly decrease from a duty ratio of 100% to a duty ratio of 0%. Changes in the first pulse width PW1 and the second pulse width PW2 from time point t0' to time point t3' may be repeated one or more times within the frame section.

Referring to FIG. 7, the first pulse width PW1 and the second pulse width PW2 may be randomly changed. For example, the distribution of the first pulse width PW1 and the second pulse width PW2 according to time in FIG. 7 may be based on the distribution of the first pulse width PW1 and the second pulse width PW2 according to time described with reference to FIG. 5 but may be randomly redistributed, it may be based on the distribution of the first pulse width PW1 and the second pulse width PW2 according to time described with reference to FIG. 6 but may be randomly redistributed, or it may be based on a combination thereof. Therefore, even if the first pulse width PW1 and the second pulse width PW2 are randomly distributed over time, a relationship between the overall distribution of the first pulse width PW1 and the second pulse width PW2 within the frame section may have a linear relationship.

When a plurality of camera modules are included in the system (e.g., 10 in FIG. 1) or a camera module of another electronic device outside the system 10 operates, to reduce the effect of interference by other camera modules, during the frame section, the first pulse width PW1 and the second pulse width PW2 may be randomly changed. The distribution of the first pulse width PW1 and the second pulse width PW2 shown in FIG. 7 may be repeated one or more times during a frame section, or the first pulse width PW1 and the second pulse width PW2 may be randomly distributed throughout the frame section.

When the first pulse width PW1 and the second pulse width PW2 are changed as described with reference to FIGS. 5 to 7, the generation of the first photo gate signal PG1_I of the triangular wave and the second photo gate signal PG2_I of the triangular wave described with reference to FIG. 4B (Hamiltonian coding method) may be simulated and the same effect may be obtained.

Figure 8:
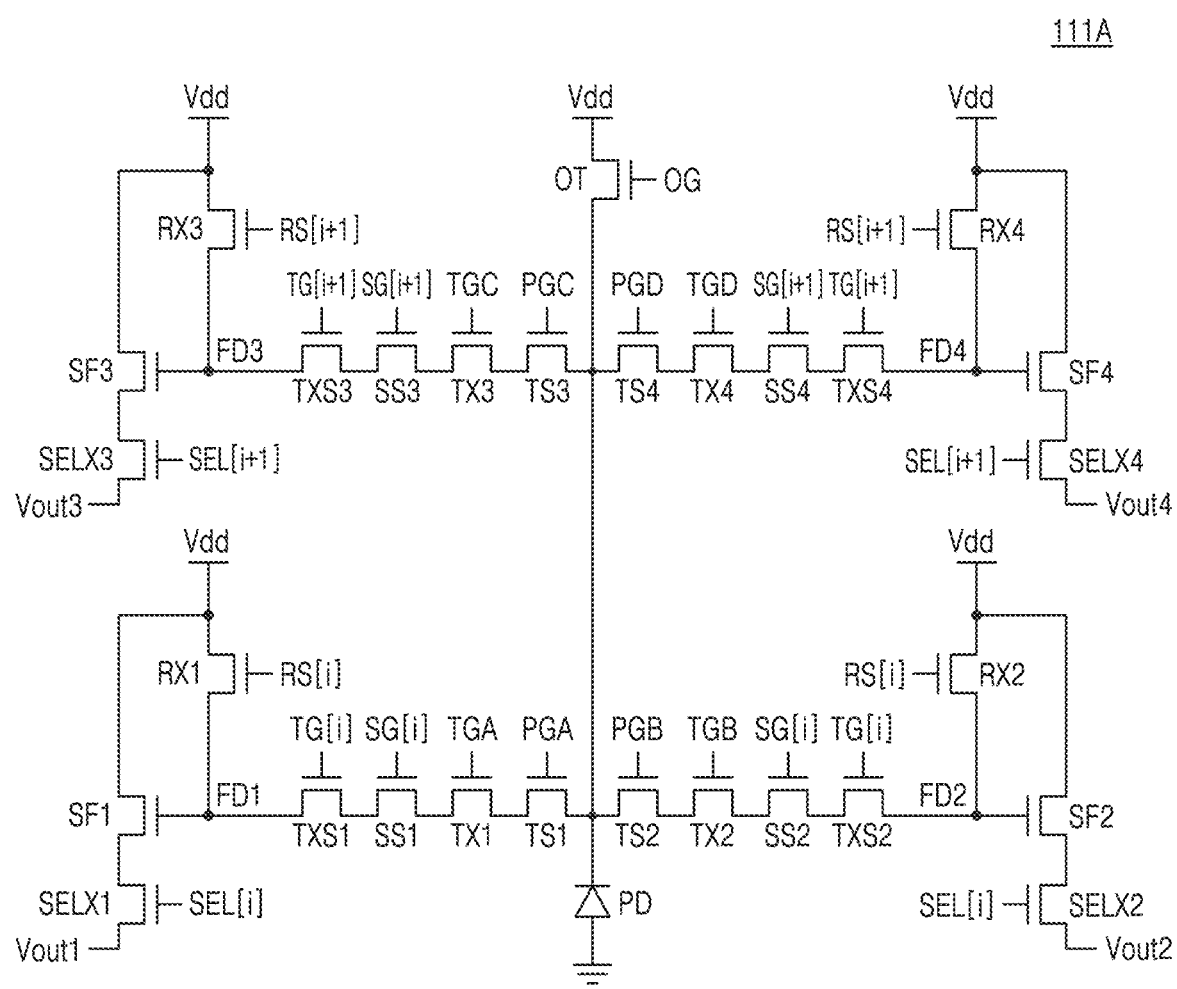
FIG. 8 is a diagram illustrating the structure of a unit pixel shown in FIG. 2 according to some example embodiments.

FIG. 8 is a diagram for explaining an embodiment of a structure of a unit pixel shown in FIG. 2.

The unit pixel 111A described with reference to FIG. 8 may have a 4-tap structure. The 4-tap structure may refer to a structure in which one unit pixel 111A includes 4 taps. In the description of FIG. 8, redundant descriptions of symbols overlapping those of FIG. 3 will be omitted.

A method in which an image sensor (e.g., 14 in FIG. 2) including unit pixels 111A of a 4-tap structure transmits data for reference phases of 0°, 90°, 180°, and 270° using four taps may be implemented. For example, based on the phase of the modulation signal MOD in FIG. 2, when the pulse widths of the photo gate signals PGA to PGD are all the same with a duty ratio of 25%, the first tap of the unit pixel 111A may generate a first pixel signal Vout1 with a phase of 0°; the second tap may generate a second pixel signal Vout2 for a 90° phase, the third tap may generate a third pixel signal Vout3 with a phase of 180 degrees, and the fourth tap may generate a fourth pixel signal Vout4 with a 270° phase.

A pixel array (e.g., 110 of FIG. 2) may include unit pixels 111A arranged in a plurality of rows and a plurality of columns. In some example embodiments, the first tap and the second tap may be disposed in the i-th row, and the third tap and the fourth tap may be disposed in the (i+1)-th row.

Referring to FIG. 8, a unit pixel 111A may include a photo diode PD, an overflow transistor OT, transfer transistors TS1 to TS4, transfer control transistors TX1 to TX4, storage transistors SS1 to SS4, tap transfer transistors TXS1 to TXS4, reset transistors RX1 to RX4, source followers SF1 to SF4, and select transistors SELX1 to SELX4. According to some example embodiments, at least one of the overflow transistor OT, the transfer control transistors TX1 to TX4, the storage transistors SS1 to SS4, the tap transfer transistors TXS1 to TXS4, the reset transistors RX1 to RX4, the source followers SF1 to SF4, and the select transistors SELX1 to SELX4 may be omitted or additional components may be included.

The first to fourth transfer transistors TS1 to TS4 may transfer charges generated by the photodiode PD to the first to fourth storage transistors SS1 to SS4, respectively, according to the first to fourth photo gate signals PGA to PGD. Accordingly, the first to fourth transfer transistors TS1 to TS4 may transfer charges generated by the photodiode PD to the first to fourth floating diffusion nodes FD1 to FD4, respectively, according to the first to fourth photo gate signals PGA to PGD.

The first to fourth photo gate signals PGA to PGD may be included in the demodulation signals DEMOD of FIG. 2 and may be signals having the same frequency and different phases. The activation section of each of the first to fourth photo gate signals PGA to PGD, that is, the sum of the pulse widths, may be constant as a modulation period (e.g., PT of FIG. 9) and may be sequentially activated. When the pulse widths of each of the first to fourth photo gate signals PGA to PGD are the same, they may have a phase difference of 90 degrees from each other. Since the image sensor according to some example embodiments changes the pulse width of each of the first to fourth photo gate signals PGA to PGD, a phase difference between the second to fourth photo gate signals PGB to PGD relative to the first photo gate signal PGA may be changed at 90°, 180°, and 270°. When the activation section of the first photo gate signal PGA ends, the activation section of the second photo gate signal PGB may start, and when the activation section of the second photo gate signal PGB ends, the activation section of the third photo gate signal PGC may start, and when the activation section of the third photo gate signal PGC ends, the activation section of the fourth photo gate signal PGD may start.

The first to fourth transfer control transistors TX1 to TX4 may transfer photo charges transferred through the first to fourth transfer transistors TS1 to TS4 to the first to fourth storage transistors SS1 to SS4, respectively, according to the first to fourth transfer control signals TGA to TGD.

The first to fourth storage transistors SS1 to SS4 may store photo charges transmitted through the first to fourth transfer transistors TS1 to TS4, respectively, according to the first storage control signal SG[i] and the second storage control signal SG[i+1]. The first to fourth tap transfer transistors TXS1 to TXS4 may transfer photo charges stored in the first to fourth storage transistors SS1 to SS4 to the first to fourth floating diffusion nodes FD1 to FD4, respectively, according to the first transfer control signal (TG[i]) and the second transfer control signal TG[i+1].

According to the potential caused by the photo charges accumulated in the first to fourth floating diffusion nodes FD1 to FD4, the first to fourth source followers SF1 to SF4 may output an amplified voltage to the first to fourth select transistors SELX1 to SELX4, respectively. The first to fourth select transistors SELX1 to SELX4 may output first to fourth pixel signals Vout1 to Vout4 through column lines in response to the first selection control signal SEL[i] and the second selection control signal SEL[i+1]. The first to fourth reset transistors RX1 to RX4 may respectively reset the first to fourth floating diffusion nodes FD1 to FD4 with the power supply voltage Vdd in response to the first reset control signal RS[i] and the second reset control signal RS[i+1].

Figure 9A:
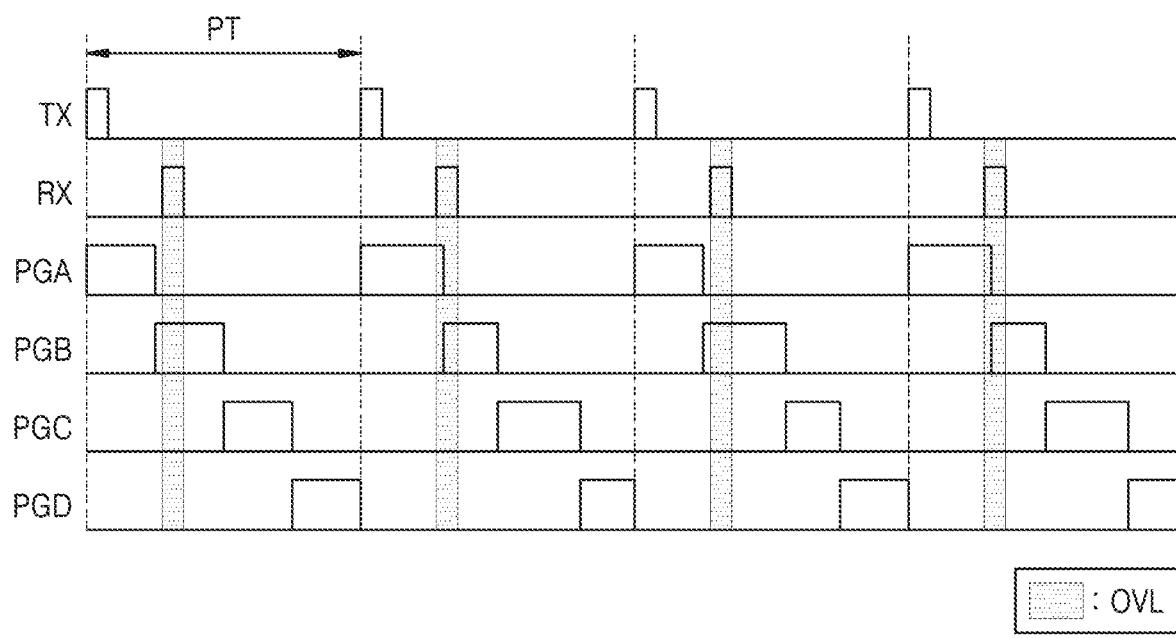
FIG. 9A is a diagram illustrating operations of an image sensor according to some example embodiments.
Figure 9B:
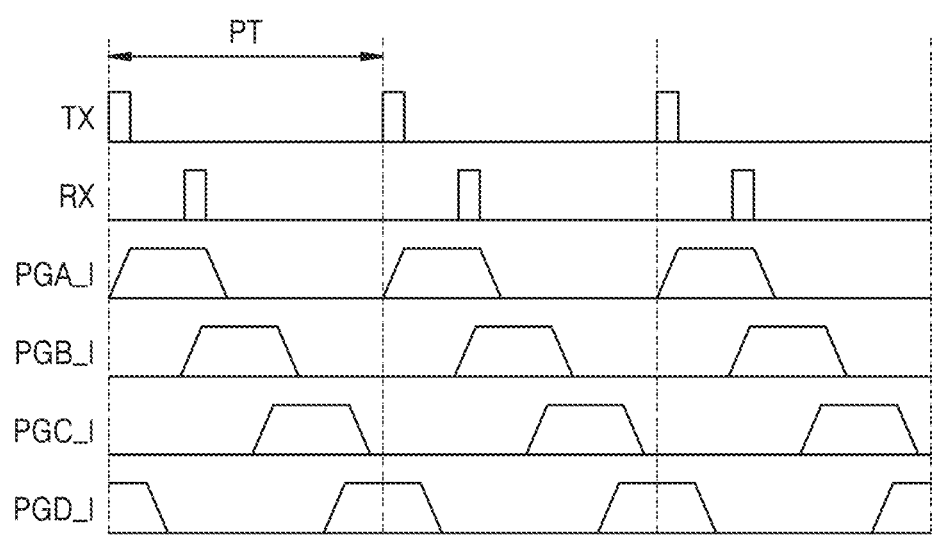
FIG. 9B is a timing diagram illustrating effects of first to fourth photo gate signals of FIG. 9A according to some example embodiments.

FIG. 9A is a diagram illustrating operations of the image sensor according to some example embodiments, and is a timing diagram for explaining pulse widths of the first to fourth photo gate signals PGA to PGD of FIG. 8. FIG. 9B is a timing diagram illustrating effects of the first to fourth photo gate signals PGA to PGD of FIG. 9A.

Referring to FIGS. 2 and 9A, the control circuit 120 may generate a modulation signal MOD having a modulation frequency, and accordingly, the light source unit 12 may transmit a transmission light signal TX having a modulation period PT that is a reciprocal value of the modulation frequency to the object 200. The image sensor 14 may receive a reception light signal RX having a certain period PT, and a device including the camera module 100 may measure the distance to the object 200 by calculating a phase difference between a transmission light signal TX and a reception light signal RX. In some example embodiments, the duty ratio of the modulation signal MOD, that is, the duty ratio of the transmission light signal TX may be 25% or less.

The control circuit 120 may generate first to fourth photo gate signals PGA to PGD for an operation of accumulating photo charges generated by a photodiode in one frame section. At this time, the sum of a first pulse width PWA that is an activation section of the first photo gate signal PGA, a second pulse width PWB that is an active section of the second photo gate signal PGB, a third pulse width PWC that is an activation section of the third photo gate signal PGC, and a fourth pulse width PWD that is an activation section of the fourth photo gate signal PGD may coincide with the modulation period PT.

For example, the time point at which the first photo gate signal PGA starts to be activated may be the same as the time point at which the transmission light signal TX is generated, e.g., the time point at which the modulation signal MOD is activated, and the time point at which the fourth photo gate signal PGD starts to be deactivated may be the same as the time point at which the transmission light signal TX is generated, that is, the time point at which the modulation signal MOD is activated. When the activation section of the first photo gate signal PGA ends, the activation section of the second photo gate signal PGB may start, and when the activation section of the second photo gate signal PGB ends, the activation section of the third photo gate signal PGC may start, and when the activation section of the third photo gate signal PGC ends, the activation section of the fourth photo gate signal PGD may start.

The first to fourth pulse widths PWA to PWD of the first to fourth photo gate signals PGA to PGD may be adjusted within a frame section. In some example embodiments, each of the first to fourth pulse widths PWA to PWD may be adjusted to increase or decrease linearly in a certain section.

As the first to fourth pulse widths PWA to PWD of the first to fourth photo gate signals PGA to PGD change within the frame section, an overlap section OVL in which the transmission light signal RX and the first to fourth photo gate signals PGA to PGD overlap may be changed. For example, in the first section of the modulation period PT, the overlap section OVL may be formed in an active section of the second photo gate signal PGB, and in the second section, the overlap section OVL may be formed over the activation section of the first photo gate signal PGA and the activation section of the second photo gate signal PGB, and in the third section, the overlap section OVL may be formed in an active section of the second photo gate signal PGB, and in the fourth section, the overlap section OVL may be formed over the activation section of the first photo gate signal PGA and the activation section of the second photo gate signal PGB.

When the overlap section OVL is formed in the active section of the first photo gate signal PGA, photo charges may be accumulated on the first tap. When the overlap section OVL is formed in the active section of the second photo gate signal PGB, photo charges may be accumulated in the second tap. When the overlap section OVL is formed in the active section of the third photo gate signal PGC, photo charges may be accumulated in the third tap. When the overlap section OVL is formed in the activation section of the fourth photo gate signal PGD, photo charges may be accumulated in the fourth tap.

The image sensor 14 according to the inventive concept changes the overlap section OVL by adjusting the first to fourth pulse widths PWA to PWD of the first to fourth photo gate signals PGA to PGD within a frame section so that when the reception light signal RX having a relatively short pulse width and the first to fourth photo gate signals PGA to PGD overlap at the edge of the pulse, signal distortion caused by waveform distortion of the first to fourth photo gate signals PGA to PGD may be reduced.

Specifically, referring to FIGS. 9A and 9B, the image sensor 14 according to some example embodiments may adjust the first to fourth pulse widths PWA to PWD of the first to fourth photo gate signals PGA to PGD generated as square waves in a frame section, respectively, so that generation of first to fourth photo gate signals PGA_I to PGD_I (e.g., first to fourth reference signals) of trapezoidal waveform may be simulated and the same effect may be obtained, e.g., reducing signal distortion caused by waveform distortion of the first to fourth photo gate signals PGA to PGD. Each of the first to fourth photo gate signals PGA_I to PGD_I of the trapezoidal waveform may have a modulation period PT and a phase difference of 90 degrees from each other. Alternatively, as described with reference to FIG. 4B, generation of the first to fourth photo gate signals of a triangular wave may be simulated.

Compared to generating the first to fourth photo gate signals of a square wave having a constant pulse width, in the case of generating the first to fourth photo gate signals PGA_I to PGD_I of trapezoidal (or triangular) waveforms, finding the phase difference between the transmission light signal TX and the reception light signal RX may be accurate, and thus the resolution of depth information may be increased. Accordingly, the image sensor 14 according some example embodiments may generate depth information having an increased resolution.

Figure 10:
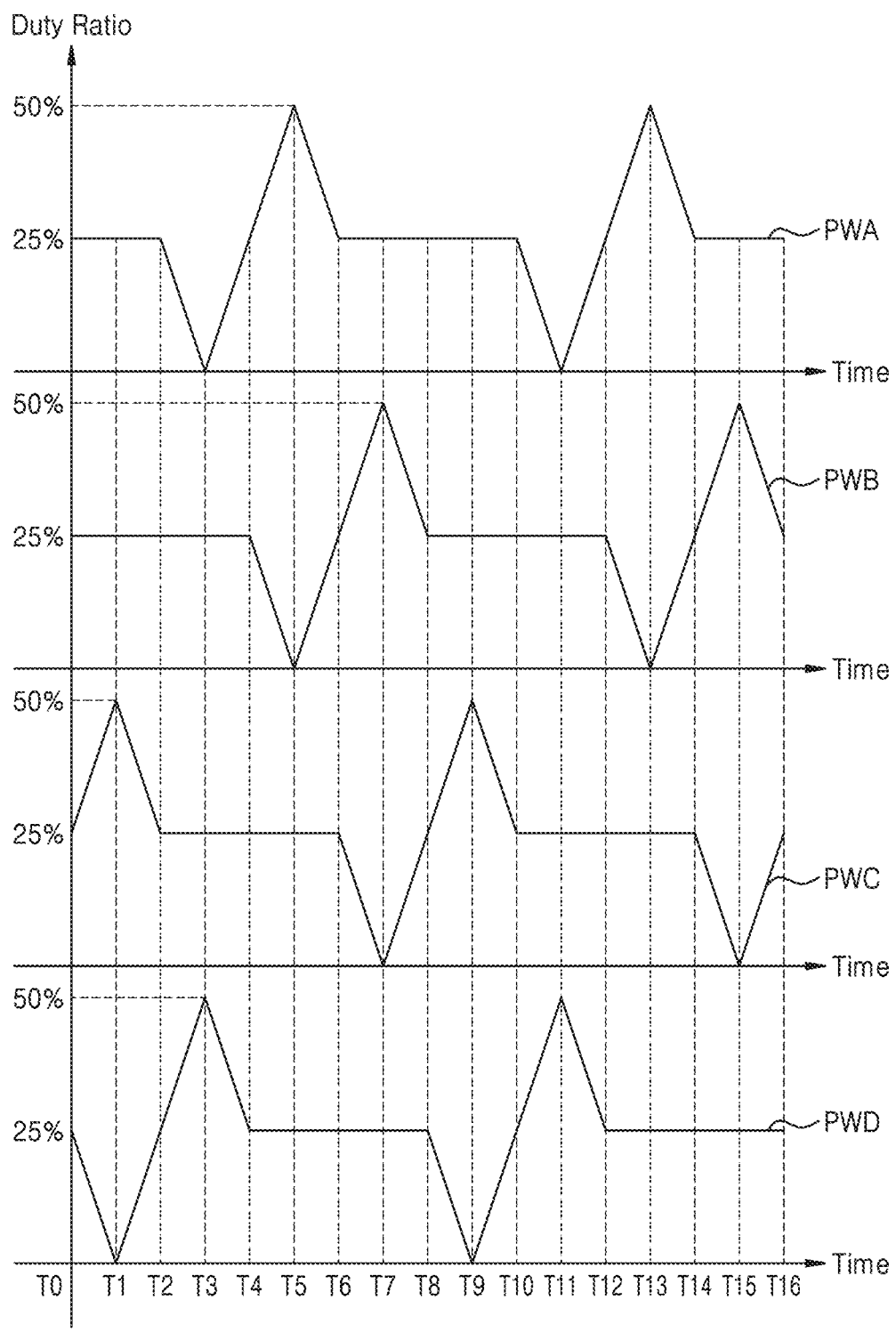
FIG. 10 is a diagram illustrating operations of an image sensor according to some example embodiments.

FIG. 10 is a diagram illustrating operations of an image sensor according to some example embodiments, and is a diagram for explaining a change in pulse width according to time during a frame section.

Referring to FIG. 10, the first to fourth pulse widths PWA to PWD of the first to fourth photo gate signals PGA through PGD may be changed between a duty ratio of 0% and a duty ratio of 50%. The sum of the first to fourth pulse widths PWA to PWD may be constant with a duty ratio (modulation period PT) of 100%.

The first pulse width PWA may have a constant value (25%) from time point T0 to time point T2, and may decrease linearly (from about 25% to about 0%) from time point T2 to time point T3. The first pulse width PWA may increase linearly (from about 0% to about 50%) from time point T3 to time point T5, may decrease linearly (about 50% to about 25%) from time point T5 to time point T6, and may have a constant value (25%) from time point T6 to time point T8. The first pulse width PWA may be adjusted from time point T8 to time point T16 in the same manner as described from time point T0 to time point T8.

The second pulse width PWB may have a constant value (25%) from time point T0 to time point T4, and may decrease linearly (from about 25% to about 0%) from time point T4 to time point T5. The second pulse width PWB may increase linearly (from about 0% to about 50%) from time point T5 to time point T7, and decrease linearly from time point T7 to time point T8 (from about 50% to about 25%). The second pulse width PWB may be adjusted from time point T8 to time point T16 in the same manner as described from time point T0 to time point T8.

The third pulse width PWC may increase linearly (from about 25% to about 50%) from time point T0 to time point T1, and decrease linearly from time point T1 to time point T2 (from about 50% to about 25%). The third pulse width PWC may have a constant value (25%) from time point T2 to time point T6, may decrease linearly (from about 25% to about 0%) from time point T6 to time point T7, and may linearly increase (from about 0% to about 25%) from time point T7 to time point T8. The third pulse width PWC may be adjusted from time point T8 to time point T16 in the same manner as described from time point T0 to time point T8.

From time point T0 to time point T1, the fourth pulse width PWD may decrease linearly (from about 25% to about 0%), and increase linearly from time point T1 to time point T3 (about 0% to about 50%). The third pulse width PWC may linearly decrease (from about 50% to about 25%) from time point T3 to time point T4 and may have a constant value (25%) from time point T4 to time point T8. The fourth pulse width PWD may be adjusted from time point T8 to time point T16 in the same manner as described from time point T0 to time point T8.

Changes in the first to fourth pulse widths PWA to PWD from time point T0 to time point T16 may be repeated one or more times within a frame section. FIG. 10 is an example of a method of changing the first to fourth pulse widths PWA to PWD in a frame section, and the image sensor according to some example embodiments may adjust the first to fourth pulse widths PWA to PWD in various ways other than the method described with reference to FIG. 10. For example, as described with reference to FIG. 7, the frame section has the distribution of the first to fourth pulse widths PWA to PWD described with reference to FIG. 10, but may be randomly redistributed according to time to adjust the first to fourth pulse widths PWA to PWD. When the first to fourth pulse widths PWA to PWD are changed, the generation of the first to fourth photo gate signals PGA_I to PGD_I of the trapezoidal waveform described with reference to FIG. 9B may be simulated and the same effect may be obtained.

Figure 11:
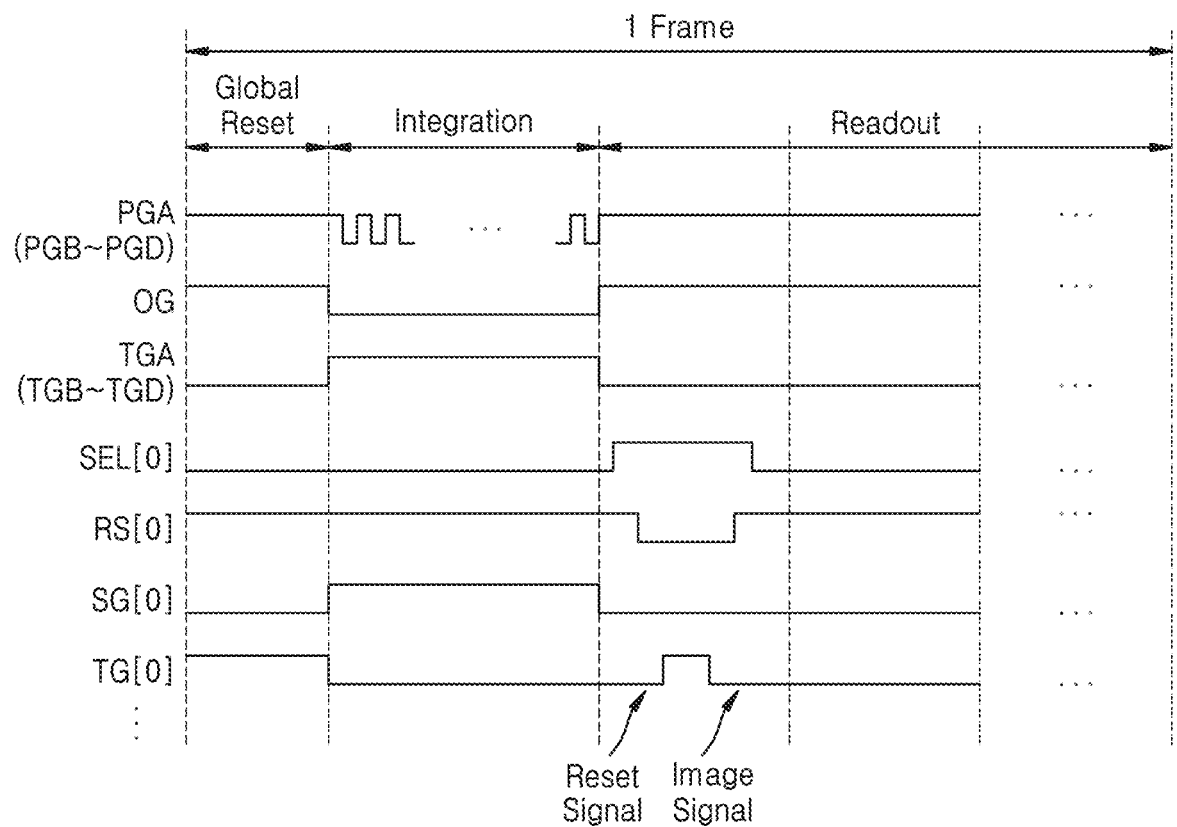
FIGS. 11 and 12 are diagrams illustrating operations of an image sensor according to some example embodiments.
Figure 12:
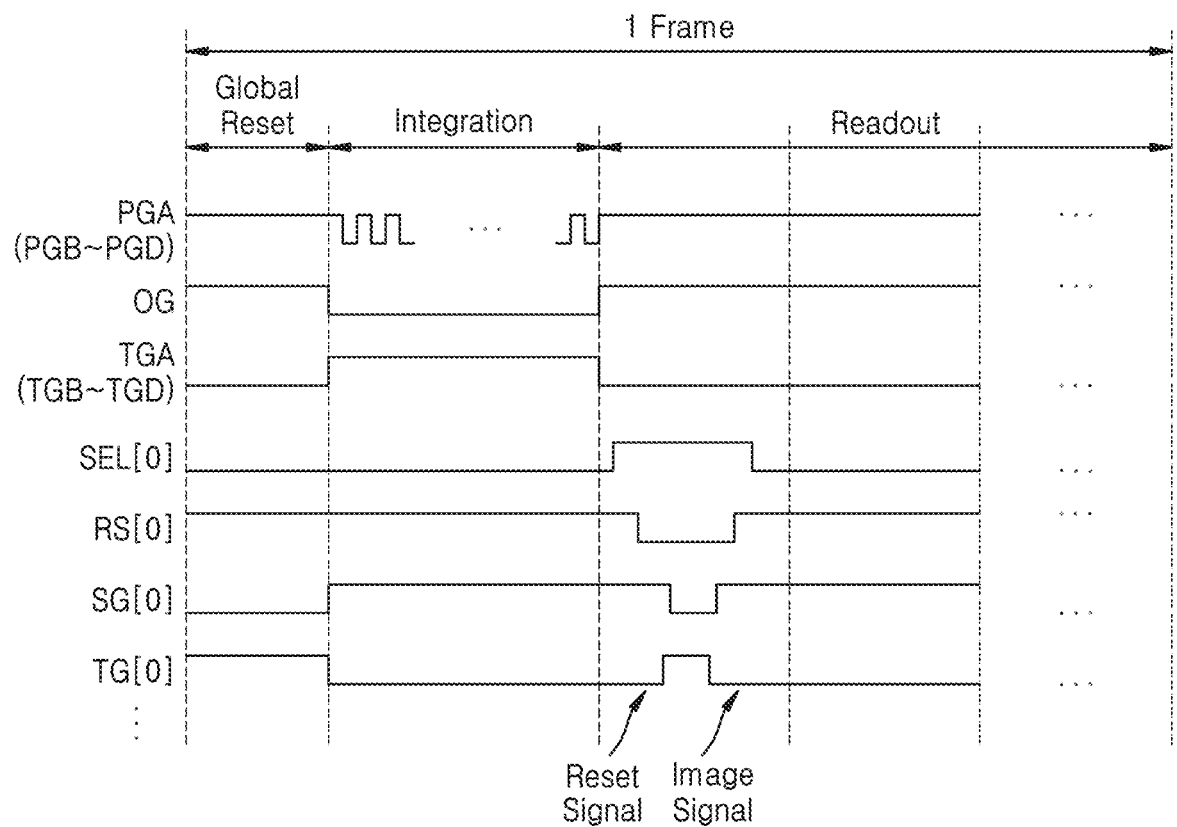

FIGS. 11 and 12 are diagrams for explaining operations of an image sensor according to some example embodiments. FIGS. 11 and 12 are timing diagrams for explaining signals generated in one frame section. The description of FIGS. 11 and 12 may be applied to an image sensor including unit pixels of a 4-tap structure, and may similarly be applied to an image sensor including unit pixels of a 2-tap structure.

Referring to FIGS. 8 and 11, one frame section may include a global reset section, a light collecting (or, integration) section, and a readout section. In the global reset section, the reset control signals RS[0] and RS[1] (RS[1] not shown) and the overflow control signal OG may maintain a logic high level, the first to fourth floating diffusion nodes FD1 to FD4 of each of the unit pixels 111A included in the pixel array (e.g., 110 in FIG. 2) may be reset, and the photodiode PD may also be reset.

In the integration section, the first to fourth photo gate signals PGA to PGD of the square wave may be toggled to have a modulation frequency. At this time, the pulse widths of the first to fourth photo gate signals PGA to PGD in the integration section may be changed as described with reference to FIG. 9A and the like, and the same effect as triangular or trapezoidal photo gate signal may be obtained.

In the integration section, the overflow control signal OG may maintain a logic low level, and the first to fourth transfer control signals TGA to TGD may maintain a logic high level. In the integration section, the select control signals SEL[0] and SEL[1] (SEL[1] not shown) may maintain a logic low level, the reset control signals RS[0] and RS[1] may maintain a logic high level, the storage control signals SG[0] and SG[1] (SG[1] not shown) may maintain a logic high level, and the tap transfer control signals TG[0] and TG[1] (TG[1] not shown) may maintain a logic low level. Accordingly, photo charges may be accumulated in the first to fourth storage transistors SS1 to SS4 in the integration section.

In the global reset section and integration section, the same select control signals SEL[0] and SEL[1], reset control signals RS[0] and RS[1], storage control signals SG[0] and SG[1], and tap transfer control signals TG[0] and TG[1], may be provided to all unit pixels 111A arranged in all columns of the pixel array 110. Such an operation may be referred to as a global operation.

In the readout section, the first to fourth photo gate signals PGA to PGD maintain a logic high level, the overflow control signal OG may maintain a logic high level, and the first to fourth transfer control signals TGA to TGD may maintain a logic low level.

In the readout section, a rolling operation in which a readout operation is sequentially performed from the first column to the n-th column of the pixel array 110 may be performed. For example, while the select control signal SEL[0] provided to the first column maintains a logic high level, the reset control signal RS[0] may be changed to a logic low level.

While the reset control signal RS[0] maintains a logic low level, the storage control signal SG[0] may be changed to a logic low level, and the tap transfer control signal TG[0] may be changed to a logic high level. Before the tap transfer control signal TG[0] is changed to a logic high level, reset signals may be output as first to fourth pixel signals Vout1 to Vout4, and if the tap transfer control signal TG[0] transitions back to the logic low level after changing to the logic high level, image signals may be output as pixel signals (e.g., first to fourth pixel signals Vout1 to Vout4). The reset signal may be a pixel signal corresponding to a reset state of the first to fourth floating diffusion nodes FD1 to FD4, and the image signal may be a pixel signal corresponding to photo charges generated by the photodiode PD. In the readout circuit (e.g., 130 of FIG. 2), read noise may be minimized by performing a Correlated Double Sampling (CDS) operation of comparing the reset signal and the image signal with the ramp signal, respectively.

In the readout section, the storage control signal SG[0] may maintain a logic low level. For example, the storage control signal SG[0] maintains a logic high level only in the integration section where the first to fourth photo gate signals PGA to PGD are activated, thereby suppressing dark current.

When the readout operation for the unit pixels 111A arranged in the first column is completed, a readout operation may be performed on the unit pixels 111A arranged in the second column, and the descriptions of the select control signal SEL[0], the reset control signal RS[0], the storage control signal SG[0], and the tap transfer control signal TG[0] provided to the unit pixels 111A arranged in the first column may be equally applied.

Referring to FIG. 12, compared to FIG. 11, after the storage control signal SG[0] maintains the logic high level until the tap transfer control signal TG[0] transitions to the logic high level, in the readout section, when the tap transfer control signal TG[0] transitions to a logic high level, the storage control signal SG[0] may transition to a logic low level. By maintaining the voltage of the tap transfer control signal TG[0] at a logic high level until the image signal is readout, charges generated by the photodiode PD may increase a full well capacity stored in the storage transistors (e.g., the first to fourth storage transistors SS1 to SS4).

Also, when the tap transfer control signal TG[0] transitions from the logic high level to the logic low level again, the storage control signal SG[0] may transition from the logic low level to the logic high level, and the image signal may be readout.

Figure 13:
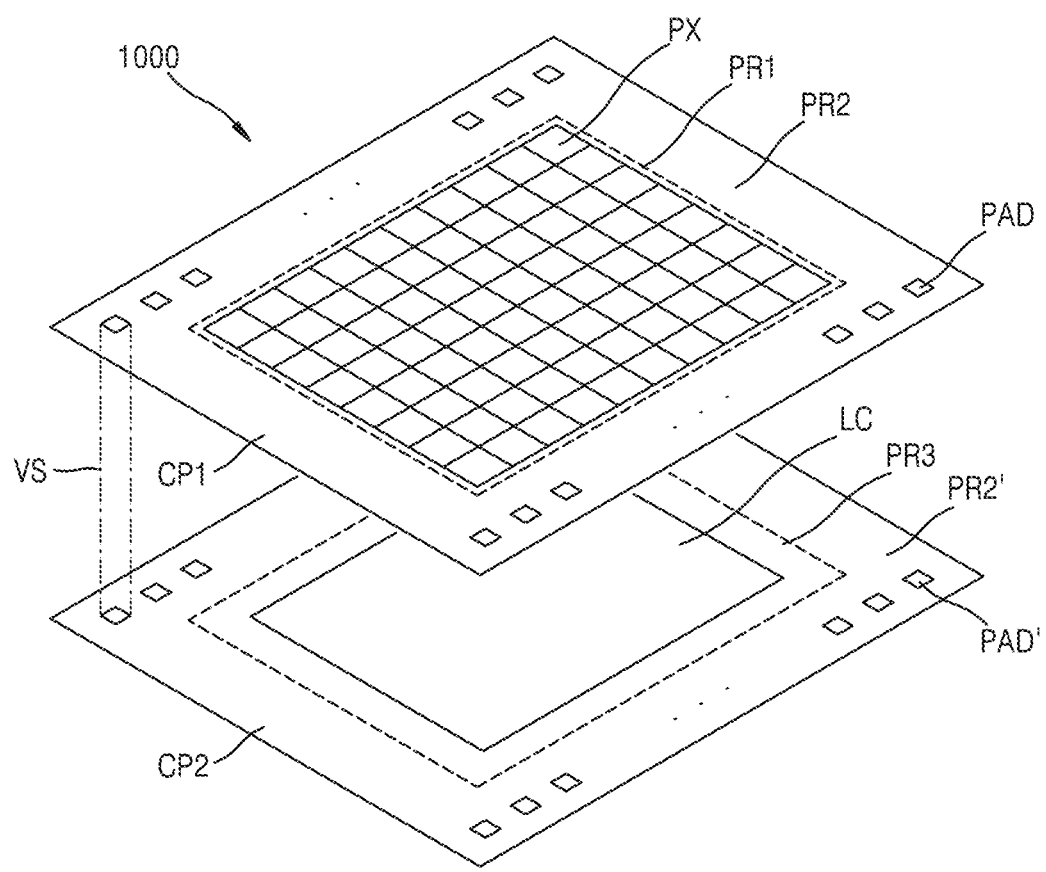
FIG. 13 is a schematic diagram illustrating an image sensor according to some example embodiments.

FIG. 13 is a schematic diagram illustrating an image sensor according to some example embodiments.

Referring to FIG. 13, an image sensor 1000 may be a stacked image sensor including a first chip CP1 and a second chip CP2 stacked in a vertical direction. The image sensor 1000 may be an implementation of the image sensor 14 described with reference to FIG. 1.

The first chip CP1 may include a pixel area PR1 and a pad area PR2, and the second chip CP2 may include a peripheral circuit area PR3 and a lower pad area PR2'. A pixel array in which a plurality of unit pixels PX is disposed may be formed in the pixel area PR1 and the pixel area PR1 may include the pixel array 110 described with reference to FIG. 2, and the plurality of unit pixels PX may include the unit pixels 111 and 111A described with reference to FIGS. 3 and 8.

The peripheral circuit area PR3 of the second chip CP2 may include the logic circuit block LC and may include a plurality of transistors. For example, the logic circuit block LC may include at least some of the control circuit 120 and the readout circuit 130 described with reference to FIG. 2. The peripheral circuit area PR3 may provide a control signal to each of the plurality of pixels PX included in the pixel area PR1 and may read a pixel signal output from each of the plurality of pixels PX.

The lower pad area PR2' of the second chip CP2 may include a lower conductive pad PAD'. The lower conductive pads PAD' may be plural and may correspond to the conductive pads PAD, respectively. The lower conductive pad PAD' may be electrically connected to the conductive pad PAD of the first chip CP1 through the via structure VS.

While some example embodiments have been particularly shown and described, it will be understood that various changes in form and details may be made without departing from the spirit and scope of the following claims.

What is claimed is:

1. An image sensor for distance measurement, the image sensor comprising:
   a pixel array including a plurality of unit pixels;
   a control circuit configured to provide a plurality of photo gate signals to the plurality of unit pixels, respectively; and
   a readout circuit configured to read out pixel signals from the pixel array on a frame-by-frame basis, and
   wherein the control circuit is configured to generate the plurality of photo gate signals such that a pulse width is changed within one frame section, and wherein a sum of first pulse widths of the plurality of photo gate signals in the frame section is constant at a modulation period.

2. The image sensor of claim 1, wherein the pulse widths of the plurality of photo gate signals linearly increase or linearly decrease in a certain section within the frame section.

3. The image sensor of claim 1, wherein the plurality of photo gate signals comprise a first photo gate signal and a second photo gate signal, and
wherein the plurality of unit pixels have a 2-tap structure including two taps configured to generate a first pixel signal and a second pixel signal, respectively, according to the first photo gate signal and the second photo gate signal.

4. The image sensor of claim 3, wherein a first pulse width of the first photo gate signal and a second pulse width of the second photo gate signal have a same width as each other in the frame section, and are changed to simulate a first reference signal and a second reference signal of triangular waves having a phase difference of 180 degrees from each other, respectively.

5. The image sensor of claim 4, wherein the first pulse width of the first photo gate signal and the second pulse width of the second photo gate signal are randomly changed within the frame section.

6. The image sensor of claim 3, wherein, a duty ratio of a first pulse width of the first photo gate signal increases linearly from 0% to 100% from a first time point to a second time point, and the duty ratio of the first pulse width of the first photo gate signal decreases linearly from 100% to 0% from the second time point to a third time point, and
wherein a duty ratio of a second pulse width of the second photo gate signal decreases linearly from 100% to 0% from the first time point to the second time point, and the duty ratio of the second pulse width of the second photo gate signal increases linearly from 0% to 100% from the second time point to the third time point.

7. The image sensor of claim 3, wherein a duty ratio of a first pulse width of the first photo gate signal increases linearly from 0% to 100% from a first time point to a second time point, and the duty ratio of the first pulse width of the first photo gate signal increases linearly from 0% to 100% from the second time point to a third time point, and
wherein a duty ratio of a second pulse width of the second photo gate signal decreases linearly from 100% to 0% from the first time point to the second time point, and the duty ratio of the second pulse width of the second photo gate signal decreases linearly from 100% to 0% from the second time point to the third time point.

8. The image sensor of claim 1,
wherein each of the plurality of unit pixels comprises:
a photodiode configured to generate photo charges according to an intensity of a reception light signal;
a plurality of storage transistors configured to store the photo charges generated by the photodiode; and
a plurality of transfer transistors configured to transfer the photo charges to the plurality of storage transistors according to the plurality of photo gate signals,
wherein signals input to gates of the plurality of storage transistors maintain a logic high level in an integration section in which the plurality of photo gate signals are activated.

9. The image sensor of claim 1, wherein each of the plurality of unit pixels comprises:
a photodiode configured to generate photo charges according to an intensity of a reception light signal;
a plurality of storage transistors configured to store the photo charges generated by the photodiode; and
a plurality of transfer transistors configured to transfer the photo charges to the plurality of storage transistors according to the plurality of photo gate signals,
wherein signals input to gates of the plurality of storage transistors have a logic high level when the pixel signals are output to the readout circuit.

10. A camera module comprising:
a light source unit configured to transmit a transmission light signal to an object; and
an image sensor configured to receive a reception light signal reflected from the object,
wherein the image sensor comprises
a pixel array including a plurality of unit pixels,
a control circuit configured to transmit a modulation signal to the light source unit and transmit a plurality of photo gate signals having an identical modulation frequency to that of the modulation signal to each of the plurality of unit pixels, and
a readout circuit configured to read out pixel signals from the pixel array on a frame-by-frame basis, and
wherein the control circuit is configured to generate the plurality of photo gate signals such that a pulse width is changed within one frame section, and
wherein within the frame section, a sum of pulse widths of the plurality of photo gate signals is constant at a modulation period that is a reciprocal of the modulation frequency.

11. The camera module of claim 10, wherein the plurality of photo gate signals linearly increase or linearly decrease in a certain section within the frame section.

12. The camera module of claim 10, wherein the plurality of photo gate signals comprise a first photo gate signal and a second photo gate signal, and
wherein the plurality of unit pixels have a 2-tap structure including two taps configured to generate a first pixel signal and a second pixel signal, respectively, according to the first photo gate signal and the second photo gate signal.

13. The camera module of claim 12, wherein a time point at which the first photo gate signal starts to be activated is a same time point as a time point at which the transmission light signal is generated, and
wherein a time point at which the second photo gate signal starts to be activated is a same time point as a time point at which the first photo gate signal starts to be deactivated.

14. The camera module of claim 12, wherein a first pulse width of the first photo gate signal and a second pulse width of the second photo gate signal are changed to simulate a first reference signal and a second reference signal of triangular waves having a same width as each other in the frame section and having a phase difference of 180 degrees from each other, respectively.

15. The camera module of claim 14, wherein the first pulse width of the first photo gate signal and the second pulse width of the second photo gate signal are randomly changed within the frame section.

16. A camera module comprising:
a light source unit configured to transmit a transmission light signal to an object; and
an image sensor configured to receive a reception light signal reflected from the object,
wherein the image sensor comprises
a pixel array including a plurality of unit pixels, a control circuit configured to transmit a plurality of photo gate signals to each of the plurality of unit pixels in an integration section in which photo charges generated according to the reception light signal are accumulated, and a readout circuit configured to read out pixel signals from the pixel array in a readout section, and wherein the control circuit is configured to generate the plurality of photo gate signals such that a pulse width is changed in the integration section, and wherein a sum of pulse widths of the plurality of photo gate signals in the integration section is constant at a modulation period.

17. The camera module of claim 16, wherein the plurality of photo gate signals are square waves.

18. The camera module of claim 16, wherein, within the integration section, the plurality of photo gate signals are changed to simulate a plurality of reference signals of triangular waves having a same width as each other and having a phase difference of 90 degrees or 180 degrees from each other, respectively.

* * * * *